United States Patent [19]
Vali et al.

[11] 4,013,365
[45] Mar. 22, 1977

[54] LASER GYROSCOPE

[75] Inventors: Victor Vali; Richard W. Shorthill, both of Salt Lake City, Utah; Raymond Goldstein, Arcadia, Calif.; Reuben S. Krogstad, Seattle, Wash.

[73] Assignee: The University of Utah, Salt Lake City, Utah

[22] Filed: June 11, 1975

[21] Appl. No.: 585,981

Related U.S. Application Data

[63] Continuation-in-part of Ser. No. 501,917, Aug. 29, 1974, abandoned.

[52] U.S. Cl. .................... 356/106 LR; 331/94.5 C; 350/96 C
[51] Int. Cl.² .......................................... G01B 9/02
[58] Field of Search ........ 356/106 LR; 331/94.5 C; 350/96 C

[56] References Cited
UNITED STATES PATENTS

| | | | |
|---|---|---|---|
| 3,102,953 | 9/1963 | Wallace | 356/106 LR |
| 3,395,270 | 7/1968 | Speller | 356/106 LR |
| 3,484,169 | 12/1969 | Skalski et al. | 356/106 LR |

FOREIGN PATENTS OR APPLICATIONS

| | | | |
|---|---|---|---|
| 1,807,247 | 5/1970 | Germany | 356/106 LR |

*Primary Examiner*—John K. Corbin
*Assistant Examiner*—Conrad Clark

[57] ABSTRACT

An apparatus for determining rotation of an area including optical apparatus for optically circumscribing the area and to guide laser radiation counter-directionally around the circumscribed area. Differences that develop between the clockwise and counterclockwise laser radiation as a function of the rotation of the area are detected to determine the rotation of the area. The optical apparatus includes an optical fiber waveguide which may function as a laser cavity or a ring inferometer path. The ring inferometer may also be provided by at least three reflective surfaces.

1 Claim, 3 Drawing Figures

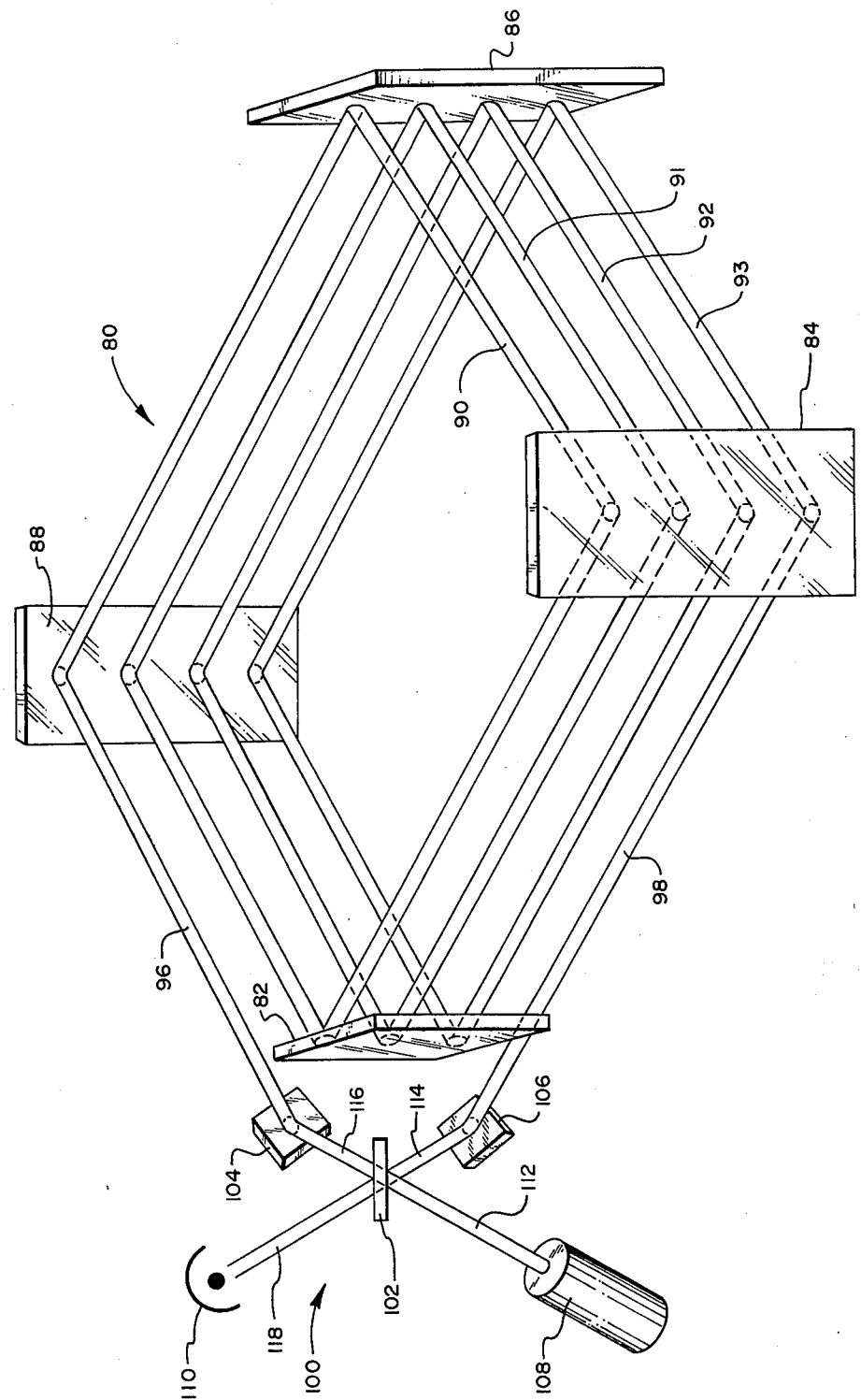

LASER GYROSCOPE

This is a continuation-in-part of our copending application Ser. No. 501,917 filed Aug. 29, 1974, now abandoned.

BACKGROUND

1. Field of the Invention

This invention relates to gyroscopes and more particularly to improvements in laser gyroscopes.

2. The Prior Art

One of the most dramatic recent developments in optical technology is the laser gyroscope, which combines the properties of the optical oscillator, the laser, and general relativity to produce an integrating rate gyroscope.

The laser gyroscope measures path differences of less than $10^{-6}$ A, and frequency changes of less than 0.1 Hz (a precision of better than one part in $10^{15}$) in order to read rotation rates of less than 0.1° per hour. The conventional instrument is simply a laser that has three or more reflectors arranged to enclose an area. The three mirrors, together with the light-amplifying material in the laser path, comprise an oscillator (laser). In fact, there are two oscillators, one that has energy travelling clockwise, and one that has energy travelling counterclockwise around the same physical cavity.

The frequencies at which these oscillators operate are determined by the optical path length of the cavity they travel. In order to sustain oscillation, two conditions must be met: The gain must be equal to unity at some power level set by the amplifying medium, and the number of wavelengths in the cavity must be an exact integer (that is, the phase shift around the cavity must be zero). If the first condition is to be achieved, the laser frequency must be such that the amplifying medium has sufficient gain to overcome the losses at the reflectors and other elements in the laser path. In addition, the wavelength must be an exact integer for the path around the cavity. This last condition actually determines the oscillation frequency of the laser.

When the enclosed ring is rotated in inertial space, the clockwise and counterclockwise paths have different lengths. The path difference in these two directions causes the two oscillators to operate at different frequencies. The difference is proportional to the rate at which the ring is rotating since path difference is proportional to inertial rotation rate. The readout of the gyroscope is accomplished by monitoring the frequency difference between the two lasers.

The laser gyroscope assembly consists of the gain media, the reflectors defining the path and enclosed area, and a readout device for monitoring the difference between the two oscillators.

For measuring small length changes the use of an optical oscillator was proposed, in which the cavity dimensions and lengths determined the oscillation frequency. In this manner a small length change is transformed into an easily measured frequency difference between oscillators. The laser gyroscope uses two oscillators at high frequencies ($3-5 \times 10^{14}$ Hz). Exact frequencies are determined by the length of the two cavities, one for clockwise and the other for counterclockwise travelling radiation.

The laser oscillator operates at light frequencies and, as in all oscillators, it must have a gain mechanism arranged in such a way that the losses are compensated for. It must also operate at a frequency controlled so that the phase shift for a trip around the cavity is zero.

In addition to the oscillator conditions of gain and loss, the condition of zero phase shift must also exist. Another way of saying this is that the number of wavelengths in the cavity must be equal to an integer. In the laser gyroscope this integer is several millions. Many frequencies will satisfy these conditions of zero phase, but they are separated by an amount equal to $c/L$ (the speed of light, $c$, divided by the total length of the cavity, $L$). For a total length of one meter the frequency separation is 300 MHz.

The length differences in the two paths due to inertial rotation rates cause a difference in the frequency of these two oscillators, whereas physical changes in length caused by temperature, vibration, etc., do not cause frequency differences. The fundamental boundary condition is that the laser wavelength, $\lambda$, must be equal to an integer fraction of the optical length around the cavity. Stated another way, the length of the cavity is equal to an integral number of wavelengths. N is an integer typically in the range of $10^5$ to $10^6$, and $$L = N\lambda \tag{1}$$

A length change of $\Delta L$ will cause a wavelength change $$\Delta \lambda = \frac{\Delta L}{N} \tag{2}$$

The corresponding frequency change, $\Delta f$, is given as $$\frac{\Delta f}{f} = \frac{\Delta L}{L} \tag{3}$$

Therefore, given small length differences $\Delta L$ and reasonable cavity lengths $L$, the operating frequency should be as high as possible.

The relation between inertial input rates, $\omega$, and apparent length change $\Delta L$ has been given as $$\Delta L = \frac{4 A \omega}{c} \tag{4}$$

The relation between $\Delta f$ and $\omega$, in terms of the gyroscope size and wavelength, is determined by substituting Eq. (3) into Eq. (4), giving $$\Delta f = \frac{4 A \omega}{\lambda L} \quad (c = \lambda f) \tag{5}$$

This concept forms the basis for the recent development in conventional laser gyroscopes wherein the apparent change in length of the laser cavity of a ring laser manifests itself as a shift in the laser frequency and the development of a beat frequency between counterdirectionally travelling laser radiation. Beat frequency is measurable to provide an indication of the rate of angular rotation of the laser cavity about an axis.

Additional useful discussion of some of the basic theories involved in the laser gyroscope may further be found in IEEE SPECTRUM "The Laser Gyro," Joseph Killpatrick, pages 44-55 (October 1967).

From the foregoing relationship, equation 5, it is readily observable that in order to increase the beat frequency, $\Delta f$, for a particular rotation rate, it is necessary to increase the area, A.

Increasing the size of the area circumscribed by a ring laser cavity has certain limits as far as practical application of the laser gyroscope is concerned. In particular, enlarging the area circumscribed by a laser cavity machined from a solid block of quartz becomes impractical beyond the current laser gyroscope which is generally commercially fabricated from a solid block of quartz. In this event, three individual ring laser cavities are machined in the quartz, one for each of the three axes to give the laser gyroscope a three-dimensional capability. Quartz is the preferred material of construction because of its low coefficient of thermal expansion and, therefore, for larger sizes of quartz structure the cost becomes increasingly greater.

Other limitations include such factors as, for example, accommodating the large gyroscope size in the vehicle in which it is placed, temperature fluctuations experienced by the gyroscope support structure (thus the preference for quartz), and other changes caused by local support disturbances such as microseisms, etc. These factors are of significance since the improved laser gyroscope of this invention is also useful as a velocity measuring device and for the measurement of extremely small rotational rates and rotation rate changes, for example, those experienced in the measurement of polar wobble, earth tides, continental drift, length of day variations, etc.

With respect to these lower rotation rates, another important consideration is an effect referred to in the art as "pulling" which is the phenomena experienced when the beat frequency is less than about 100 Hertz (Hz). Pulling manifests itself in fluctuating frequencies independent of the rotation rate and is an inherent deficiency of the conventional laser gyroscopes. Pulling can be minimized by either increasing the area circumscribed by the laser cavity as previously discussed or by externally increasing the rotation rate by a known amount and thereafter compensating for the known rotation rate when determining the true rotation rate.

In view of the foregoing, what is needed is another and relatively simple device to increase the effective area counter-directionally circumscribed by the laser radiation to thereby provide an increased measurable difference between the clockwise and counterclockwise laser radiation per unit of angular rotation of the area.

BRIEF SUMMARY AND OBJECTS OF THE INVENTION

The present invention relates to an improved laser gyroscope apparatus and method wherein the optical guidance system for the laser radiation is greatly simplified and the distance traversed by the counter directionally travelling laser radiation is increased to provide a greater sensitivity with respect to either the beat frequency or the fringe shift that develops as a result of rotation of the gyroscope.

A single coil of optical fiber waveguide is used as a laser cavity in one preferred embodiment and may be of extended length to increase the sensitivity of the apparatus with respect to the beat frequency developed. Alternatively the single coil of optical fiber waveguide may be used as a laser path for externally introduced laser radiation, ring interferometer.

The optical fiber waveguide may also be coiled a plurality of times about an area as a laser light path to provide an increased path length for the laser radiation and an increased sensitivity of the apparatus with respect to the fringe shift developed. A coiled laser light path may also be preferentially provided by a plurality of mirrors which serially deflect the laser radiation in a path around the periphery of the area.

It is, therefore, a primary object of this invention to provide improvements in laser gyroscopes.

Another object of this invention is to increase the distance through which the laser radiation travels and to thereby increase the sensitivity of the laser gyroscope.

A further object of this invention is to provide an optical fiber waveguide for a laser cavity.

An even still further object of this invention is to provide a laser gyroscope wherein the laser radiation is caused to traverse the periphery of the area more than once, ring interferometer.

An even still further object of this invention is to provide a method for improving the sensitivity of a laser gyroscope.

These and other objects and features of the present invention will become more fully apparent from the following description and appended claims taken in conjunction with the accompanying drawing.

BRIEF DESCRIPTION OF THE DRAWING

FIG. 3 is a schematic perspective of a third preferred embodiment of the present invention wherein mirrors form the coiled laser path.

DETAILED DESCRIPTION OF THE PREFERRED EMBODIMENTS

Figure 2:
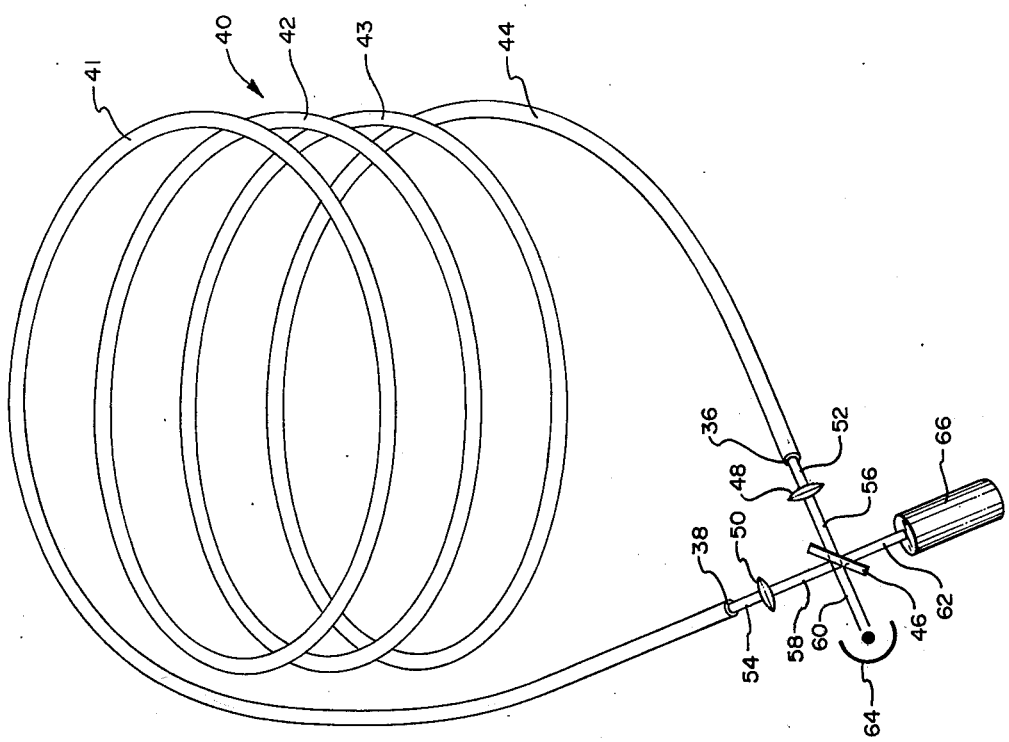
FIG. 2 is a schematic perspective of a second preferred embodiment of the present invention incorporating a plurality of loops of optical fiber waveguide as a laser path, ring interferometer.

The invention is best understood by reference to the figures wherein like parts are designated with like numerals throughout.

General

The present invention is devised to operate either as a ring laser or as a ring interferometer with certain modifications being made to increase the sensitivity of the ring interferometer.

The ring laser gyroscope of this invention includes a single coil of optical fiber waveguide which is used to optically couple one end of the gain medium to the other and thereby complete the laser cavity of the ring laser. The optical fiber waveguide is also used to circumscribe an area and may be of an extended length in order to increase the area circumscribed.

Radiant energy emitted by the gain medium becomes the laser radiation in the laser cavity with the frequency of the laser radiation being established by the length of the cavity, as discussed hereinbefore. Rotation of the cavity results in an apparent length change of the cavity as experienced by each of the clockwise and counterclockwise laser radiation with a resulting frequency change for each.

Upon removing a portion of each laser radiation and combining the same, the two frequencies cyclically cancel and reinforce each other and thereby develop a beat frequency. The beat frequency is then detected by a suitable detector and provides an indication of the rotation rate of the ring laser gyroscope.

In the alternate embodiments of this apparatus, laser radiation is introduced counter-directionally into a ring interferometer which circumscribes an area. The ring interferometer is formed from one or more coils of optical fiber waveguide or by at least three reflective surfaces which deflect the laser radiation more than once around the periphery of the area.

The laser radiation is split before entering the ring interferometer and it is in the ring interferometer that an interference pattern is established between the clockwise and counterclockwise laser radiation. The interference results from the superposition of one laser radiation on the other and constructive and destructive interference of the waves in the laser radiation results in a fringe pattern. The fringe pattern is detectable through conventional detectors when the two beams of laser radiation are combined after emerging from the ring interferometer.

Since the laser radiation source is outside the ring interferometer, the frequency of the laser radiation remains constant. With the frequency being constant and, therefore, the number of waves being constant per unit of time, changing the apparent length of the laser light path by rotation of the ring interferometer results in a greater or lesser number of waves per unit of time in each laser light path. Accordingly, rotation of the ring interferometer changes the number of waves of laser radiation that are injected into the same physical path of the ring interferometer. Superposition of these two results in the fringe pattern which shifts in either direction depending upon the direction of rotation of the ring interferometer. The magnitude of the fringe shift is a function of the rotation rate of the ring interferometer. The ring interferometer has the added advantage that at lower rotation rates there is no dead band as is experienced in the ring laser.

Each of the presently preferred embodiments of the present invention is provided with an optical system for causing laser radiation to circumscribe an area including (1) an optical fiber waveguide which may be coiled about the periphery of the effective area (a) once and serve either as a laser cavity or a ring interferometer or (b) a plurality of times as a ring interferometer or (2) mirrors which serially reflect the laser radiation a plurality of times around the effective area of the ring interferometer.

Where a single coil of optical fiber waveguide is used as the ring laser, a lasing medium is interposed directly in the optical fiber waveguide to thereby incorporate the optical fiber waveguide into the laser cavity. A gain medium such as a neodymium doped fiber is excited according to conventional techniques so as to cause the created laser radiation in the laser cavity to be emitted counter-directionally in the laser cavity. A small portion of each laser radiation in the laser cavity is deflected therefrom and combined to serve as an input for a detection device the detect the beat frequency.

For the ring interferometer embodiments, laser radiation from an external laser is introduced counter-directionally into the ring interferometer by suitable optics and the fringe shift detected by conventional techniques. The external laser may be easily supplied by a number of conventional devices.

Figure 1:
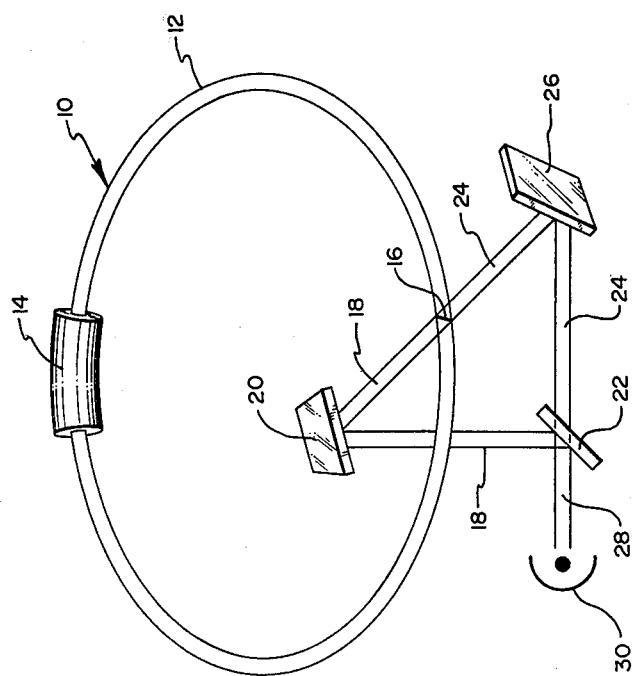
FIG. 1 is a schematic perspective of one preferred embodiment of the present invention incorporating a single loop of optical fiber waveguide as a laser cavity, ring laser.

The Embodiment of Fig. 1

Referring now to FIG. 1, a ring laser gyroscope is indicated generally at 10 and includes a single coil of optical fiber waveguide 12 into which is incorporated a section of gain medium 14. In operation, gain medium 14 stimulates laser radiation counter-directionally through the optical fiber waveguide 12 with a portion of the radiation in each direction being deflected as beams 18 and 24.

An imperfect splice 16 in optical fiber waveguide 12 serves to suitably deflect a small portion of each laser radiation as represented by beams 18 and 24. Beam 18 is deflected by a mirror 20 to a beam splitter 22 where it is combined with the counter-directionally travelling beam 24 which has been deflected by mirror 26 into beam splitter 22.

Beam splitter 22 combines each of beams 18 and 24 into a combined beam 28 where the beat frequency developed between the two beams 18 and 24 is detected by a conventional detector 30.

Detector 30 detects the observed beat frequency and the relationship between the observed beat frequency, $\Delta f$, and the angular rotation rate, $\omega$, is:

$$\Delta f = \frac{4 A \omega}{\lambda L} \tag{6}$$

From the foregoing it should be readily apparent that to increase the sensitivity of the laser gyroscope 10, it is necessary to increase the area, A, circumscribed by the optical fiber waveguide 12.

For example, a single loop of optical fiber waveguide as a laser cavity may be used to circumscribe an enlarged area such as one having a side length of ten meters. Obviously, such a device would be impractical as a gyroscope for most vehicles. However, as a geophysical gyroscope such a device would have a theoretical accuracy within a fraction of a centimeter per year. Such accuracy could easily enable the instrument to be used to measure such phenomena as length of day changes, continental drift, polar wobble and earth tides.

Alternatively, the single coil of optical fiber waveguide 12 may be used as a ring interferometer to provide a detectable fringe shift. In this event, externally developed laser radiation is counter-directionally introduced into the ring interferometer and removed therefrom in much the same manner as will be more fully described with respect to the embodiment of FIG. 2 hereinafter.

The Embodiment of FIG. 2

An increase in the laser light path differential and correspondingly greater fringe shift as between two counter-directionally travelling beams of laser radiation (and, therefore, the sensitivity of the instrument) is provided by an increase in the length of the laser light path. This length increase is preferentially provided in a condensed space by forming a ring interferometer from an optical fiber waveguide shown generally at 40 and which has been coiled more than once around an area. To reduce adverse temperature effects, the optical fiber waveguide is coiled around a mandrel (not shown) and the mandrel is preferably fabricated from quartz or other material having a low coefficient of thermal expansion.

The ring interferometer of this second preferred embodiment of this invention is an optical fiber waveguide 40 which is formed into a plurality of loops 41-44 with ends 36 and 38 optically coupled to a beam splitter 46. Optical coupling is accomplished by conventional techniques and is illustrated schematically by lenses 48 and 50 for each of ends 36 and 38, respectively, of optical fiber waveguide 40. The apparatus is completed by a detector 64 to detect the fringe shift developed between counter-directionally travelling laser beams in the optical fiber waveguide 40.

In operation, a beam 62 of laser radiation from laser 66 is split by beam splitter 46 into a first and second laser beams 56 and 58, respectively. Beams 56 and 58 are each focused by lenses 48 and 50, respectively, so as to be introduced counter-directionally throughout the optical fiber waveguide 40.

Laser radiation 52 and 54 emerging from ends 36 and 38, respectively, are, in turn, focused by lenses 48 and 50 onto beam splitter 46. Beam splitter 46 combines the emerging laser radiation into a combined beam 60 which is intercepted by a conventional detector 64 which detects any fringe shift between the two beams of laser radiation. Fringe shift develops between the counter-directionally travelling laser radiation as a result of rotation of the plane of optical fiber waveguide 40.

Optionally, a single coil of optical fiber waveguide 40, as illustrated in FIG. 1, could be optically coupled to a laser and a detector as illustrated in FIG. 2 to provide a less sensitive indication of fringe shift as a function of the rotation rate.

Although an expanded helical spiral of optical fiber waveguide 40 is shown as the ring interferometer in FIG. 2 for ease of illustration, other spirals, including a planar spiral would also serve to turn both beams of laser radiation through an integral number of 360°. Importantly, greater sensitivity is obtainable from a laser gyroscope by increasing the effective length traversed by the laser radiation. This length increase within a relatively confined space is made possible by coiling the optical fiber waveguide 40 more than once about the area.

For example, an optical fiber waveguide that is coiled 1000 times about a 15 centimeter radius cylinder is 900 meters long. If the optical fiber waveguide has an attenuation characteristic of two decibel per kilometer or 0.66 attenuation this would mean that 60% of the transmitted light is retained within the optical fiber waveguide and a portion of which is transmitted to the interferometer or detector device. For an optical fiber waveguide having a 20 decibels per kilometer attenuation only 1.6% of the light is retained within the optical fiber waveguide.

Importantly, this type of ring interferometer apparatus wherein fringe shift is detected does not have a dead band which results from mode pulling as experienced in the ring laser gyroscope which detects beat frequency as set forth in the illustrated embodiment of FIG. 1.

The Embodiment of FIG. 3

Referring now to FIG. 3, another presently preferred embodiment of the improved ring interferometer of the present invention is shown in schematic perspective and includes a ring interferometer indicated generally at 80. A plurality of mirrors 82, 84, 86 and 88 are selectively oriented by being tilted so as to deflect beams of laser radiation 90-93, in seriatim, around the periphery of the ring interferometer 80. By causing the beams 90-93 of laser radiation to traverse the periphery of the ring interferometer 80 a plurality of times, the path of the laser radiation is surprisingly extended within a relatively confined space. The extended laser path serves to increase the sensitivity of the instrument respective to detecting the fringe shift which develops as a function of the angular rotation of ring interferometer 80 about its axis.

Preferably, each mirror 82, 84, 86 and 88 successively deflects each beam of laser radiation to a progressively different point on the adjacent mirror so as to "coil" the beams of laser radiation about the periphery of ring interferometer 80.

Mirror 82 is selectively foreshortened so as to permit upper and lower beams of laser radiation 96 and 98, respectively, to each be deflected by mirrors 104 and 106, respectively, into a beam splitter 102. Mirrors 104 and 106 and beam splitter 102 form part of an optical input and output apparatus which is shown generally at 100. Beam splitter 102 is coordinated with each of mirror 104 and mirror 106 so as to selectively deflect/transmit laser radiation as between laser 108 and detector 110.

In operation, laser 108 emits a beam of laser radiation 112 which is deflected/transmitted by beam splitter 102 into laser beams 114 and 116 which are thereafter deflected by mirrors 106 and 104, respectively, so as to cause the split beams of laser radiation to be introduced counter-directionally throughout the laser beam path 90-93 of ring interferometer 80. Each of the emerging beams of laser radiation are thereafter combined by beam splitter 102 so as to be deflected/transmitted as a combined beam 118 into detector 110. Detector 110 measures the fringe shift between the split beams of laser radiation 114 and 116 in combined beam 118.

In the foregoing manner, essentially the same physical path is traversed by each of the counter-directionally travelling beams of laser radiation. Even though the physical dimensions of the ring interferometer remain fixed, rotation of the area circumscribed by the beams of laser radiation is detected as an apparent change in path length for each beam of laser radiation which change in apparent path length is detectable as a fringe shift as between the two beams.

The detector 110 may be any of a number of conventional photo detectors capable of detecting the fringe shift developed between the two beams of laser radiation.

The apparent path difference which results in a fringe shift, $\Delta z$, experienced by the counter-directionally travelling beams of laser radiation in the embodiments of FIGS. 2 and 3 is:

$$\Delta Z = \frac{4 A \omega N}{\lambda c}$$

where N is the number of turns (coils 41-44).

The Method

The method of this invention includes circumscribing an area with counter-directionally travelling laser radiation and detecting any resulting differences between the two. These differences are either (1) beat frequency or (2) fringe shift depending upon what devices are used to cause the laser radiation to circumscribe the area.

Beat frequency is readily and relatively inexpensively developed as the detectable difference when a single loop of optical fiber waveguide is incorporated into the apparatus as a laser cavity. Rotation of the plane of the laser cavity about its axis causes laser radiation in each direction in the cavity to experience an apparent change in length of the cavity. This apparent length change causes a frequency change for each laser radiation and the development of a beat frequency as between the two. This phenomenon, of course, forms the basis for the conventional laser gyroscope.

Importantly, the present method of this invention includes obtaining a single loop of optical fiber waveguide, preferably of extended length, and circumscribing an area of enlarged size with the optical fiber waveguide, the optical fiber waveguide serving as the laser cavity with a gain medium coupled therewith.

Detection of the beat frequency is accomplished by extracting a portion of the laser radiation from the cavity and directing it into a suitable detector.

Fringe shift is also readily ascertained with increased sensitivity by providing a ring interferometer for laser radiation so that the laser radiation traverses the area more than once. The ring interferometer is preferably coiled about the area in order to obtain a greatly extended laser light path within a relatively confined space. At least two embodiments are disclosed herein for practicing the method of this invention. These include (1) optical fiber waveguide and (2) mirrors, either of which suitably accomplishes the method of this invention by providing a ring interferometer.

Laser radiation for obtaining a fringe shift in the ring interferometer is provided by a single, external laser. The laser radiation is split and thereafter directed counter-directionally through the ring interferometer. The emerging laser radiation is combined and serves as the input to a conventional detector capable of detecting fringe shift that has occurred as a result of angular rotation of the plane of the ring interferometer.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for determining rotation of an area comprising:
    a single optical fiber waveguide circumscribing the area 360°;
    a gain medium optically coupled with the optical fiber waveguide so as to form a laser cavity with the optical fiber waveguide;
    means for initiating laser oscillation with laser radiation in a clockwise and a counterclockwise direction through the single optical fiber waveguide;
    means for removing a portion of each of the clockwise and counterclockwise laser radiation from the optical fiber waveguide comprising an imperfect splice in the optical fiber waveguide, the imperfect splice deflecting a portion of each of the clockwise and counterclockwise laser radiation from the optical fiber waveguide;
    means for combining the removed laser radiation; and
    means for detecting differences between the clockwise and counterclockwise laser radiation, the difference being a function of the rotation of the area, said means for detecting comprising a beat frequency detector.

* * * * *